(12) United States Patent
Dischler et al.

(10) Patent No.: US 6,311,287 B1
(45) Date of Patent: Oct. 30, 2001

(54) VARIABLE FREQUENCY CLOCK CONTROL FOR MICROPROCESSOR-BASED COMPUTER SYSTEMS

(75) Inventors: Richard J. Dischler, Bolton; Jim Klumpp, Newton; Reinhard Schumann, Stow, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/321,334

(22) Filed: Oct. 11, 1994

(51) Int. Cl.$^7$ ................. G06F 1/04; G06F 1/08
(52) U.S. Cl. ............................. 713/601; 713/322
(58) Field of Search ..................... 395/550, 750; 364/550, 557; 713/330, 320, 322, 323, 601

(56) References Cited

U.S. PATENT DOCUMENTS

| | | | | |
|---|---|---|---|---|
| 4,893,271 | * | 1/1990 | Davis et al. | 364/900 |
| 5,142,684 | * | 8/1992 | Perry et al. | 395/750 |
| 5,189,314 | * | 2/1993 | Georgiou et al. | 307/271 |
| 5,287,292 | * | 2/1994 | Kenny et al. | 364/550 |
| 5,452,401 | * | 9/1995 | Lin | 395/750 |
| 5,469,561 | * | 11/1995 | Takeda | 395/550 |
| 5,483,102 | * | 1/1996 | Neal et al. | 257/712 |
| 5,490,059 | * | 2/1996 | Mahalingaiah et al. | 394/166 |

FOREIGN PATENT DOCUMENTS 2-83720  *  3/1990  (JP) ................. G06F/1/26

* cited by examiner

*Primary Examiner*—Dennis M. Butler
(74) *Attorney, Agent, or Firm*—Cesari and McKenna (57) ABSTRACT

A computer system including a microprocessor and a circuit to provide a clock signal for the microprocessor is described. The circuit is responsive to a control signal for selecting a minimum clock signal frequency value and a maximum clock signal frequency value, with the maximum clock signal frequency value being adjusted in accordance with operating conditions of the central processor. Also the system includes a circuit which varies a magnitude of a supply voltage fed to the microprocessor in accordance with the temperature of the microprocessor and the operating frequency of the microprocessor. This arrangement provides an advantage to save power in computers. It is particularly advantageous for portable computers such as notebook computers to conserve battery charge, minimize heat dissipation in the microprocessor, and to minimize the size and weight of the battery used in the notebook for a given operating duration requirement.

10 Claims, 10 Drawing Sheets

VARIABLE FREQUENCY CLOCK CONTROL FOR MICROPROCESSOR-BASED COMPUTER SYSTEMS

BACKGROUND OF THE INVENTION

This invention relates generally to computer systems and more particularly to the power subsystems and clock subsystems employed in computer systems.

As it is known in the art, computers have become ubiquitous. In particular, a common type of computer, the so-called "personal computer", which is based upon microprocessor technology uses a standard microprocessor integrated circuit as the central processor of the computer to provide a system which is portable and generally easily affordable by many types of individuals.

Microprocessors generally are synchronous circuits, that is, they require a repetitive signal, commonly referred to as a clock signal for operation. It is also known that as technology advances, one desire is to provide microprocessors that are capable of operating at higher clock frequencies and have increasing circuit complexity. In a computer system which includes, in addition to the microprocessor, memory and I/O devices, such as an I/O interface coupled to a disk, the other devices in the computer system are typically also synchronous and require generation of clock signals for their operation.

One configuration of a personal computer commonly in use is the so-called "notebook" computer which is a portable computer that operates either under battery power or AC power from an AC power line. When operating under battery power, several problems are associated with so-called notebook computers, particularly those notebook computers which use microprocessors which operate at high clock frequencies and have high levels of circuit complexity. Power consumption increases in proportion to the clock frequency and circuit complexity. Therefore, the power consumption of the microprocessor in such notebook type computers limits the duration of operation under a battery power source between charges.

Moreover, due to the increased power dissipation from the microprocessor, the ability to effectively manage the heat generated from the microprocessor is also a concern since this heat must be dissipated to maintain the microprocessor at an acceptable operating temperature.

In operation of the microprocessor, often long periods of time are consumed as idle time in which the microprocessor is performing no useful work. Thus, even though the processor is in an idle state not performing any useful processing tasks, the processor is consuming power and dissipating heat.

Past attempts to address some of the aforementioned heat and power consumption properties of notebook computers, have included clock control circuits which turn the clock signal off to the microprocessor during periods of time when the computer system is on but the microprocessor is not actively engaged in a processing task.

One problem with this approach is that by turning the clock signal off, certain types of microprocessors may lose information since some of the internal circuitry is dynamic, that is, requires constant refresh. In particular, some complimentary metal-oxide semiconductor-based (CMOS) devices, such as the ALPHA AXP microprocessors manufactured by Digital Equipment Corporation require a minimum clock signal.

A second problem with the above approach when applied to high performance microprocessors having dynamic logic is that it does not take into consideration the temperature of the microprocessor nor the level of processing power required by the microprocessor to adequately perform all of its tasks and still conserve battery charge and maintain an acceptable operating temperature for the microprocessor.

In addition to the power and temperature problems with the aforementioned notebook type of computers, desk top as well as other computer configurations likewise have similar power and temperature considerations. For example, with desk top computers much processor time is spent as idle time, and further often a user of the desk top computer will leave the computer "on" for extended time periods (such as overnight or over a week-end) without performing any useful work. This wastes power which is undesirable from an energy conservation point of view.

SUMMARY OF THE INVENTION

In accordance with the present invention a computer system includes a microprocessor, means for generating a clock signal, said means including means responsive to a control signal for selecting a minimum clock signal frequency value and a maximum clock signal frequency value, and means for adjusting the maximum clock signal frequency value in accordance with operating conditions of the central processor. With such an arrangement, a technique is provided to vary the clock frequency of dynamic circuits such as microprocessors having dynamic logic without loss of data or operation. Further, by providing means to adjust the maximum frequency of operation a technique is provided to permit the microprocessor to run at optimal speeds taking in consideration temperature and power consumption considerations. This advantage is particularly important in portable computers such as notebook computers to conserve battery charge, minimize heat dissipation in the microprocessor, and to minimize the size and weight of the battery used in the notebook for a given operating duration requirement.

In accordance with a further aspect of the present invention, a computer system includes a microprocessor and means for varying a magnitude of a supply voltage fed to the microprocessor in accordance with the temperature of the microprocessor and the operating frequency of the microprocessor. With such an arrangement, when the microprocessor is operating at clock frequencies which permit the microprocessor to operate at a reduced supply voltage, the means for varying the supply voltage can detect this and reduce the voltage thereby saving on power consumption from the battery when in portable notebooks and heat dissipation thus improving the reliability of the microprocessor. This is a particular advantage for saving on power consumption and resulting heat dissipation, since power consumption is typically directly proportional to the square of the supply voltage.

In accordance with a still further aspect of the present invention a computer system includes a microprocessor, means for generating a clock signal, said means including means responsive to a control signal for selecting a minimum clock signal frequency value and a maximum clock signal frequency value. The computer system further includes means for adjusting the maximum clock signal frequency value in accordance with operating conditions of the central processor and means for varying a magnitude of a supply voltage fed to the microprocessor in accordance with the temperature of the microprocessor and the operating frequency of the microprocessor. With such an arrangement, a technique is provided to vary the clock frequency of dynamic circuits such as microprocessors between a minimum clock frequency and an adjustable maximum clock frequency of the microprocessor in accordance with temperature and power consumption considerations. This advantage is particularly important in portable computers such as notebook computers to conserve battery charge, minimize heat dissipation in the microprocessor, and to minimize the size and weight of the battery used in the notebook for a given operating duration requirement. In addition, when the microprocessor is operating at clock frequencies which permit the microprocessor to operate at a reduced supply voltage, the means for varying the supply voltage can detect this condition and reduce the supply voltage to the microprocessor reducing power consumption from the battery and heat dissipation.

BRIEF DESCRIPTION OF THE DRAWINGS

The above-mentioned and other features of the invention will now become more apparent by reference to the following description taken in connection with the accompanying drawings in which.

DESCRIPTION OF THE PREFERRED EMBODIMENTS

Figure 1:
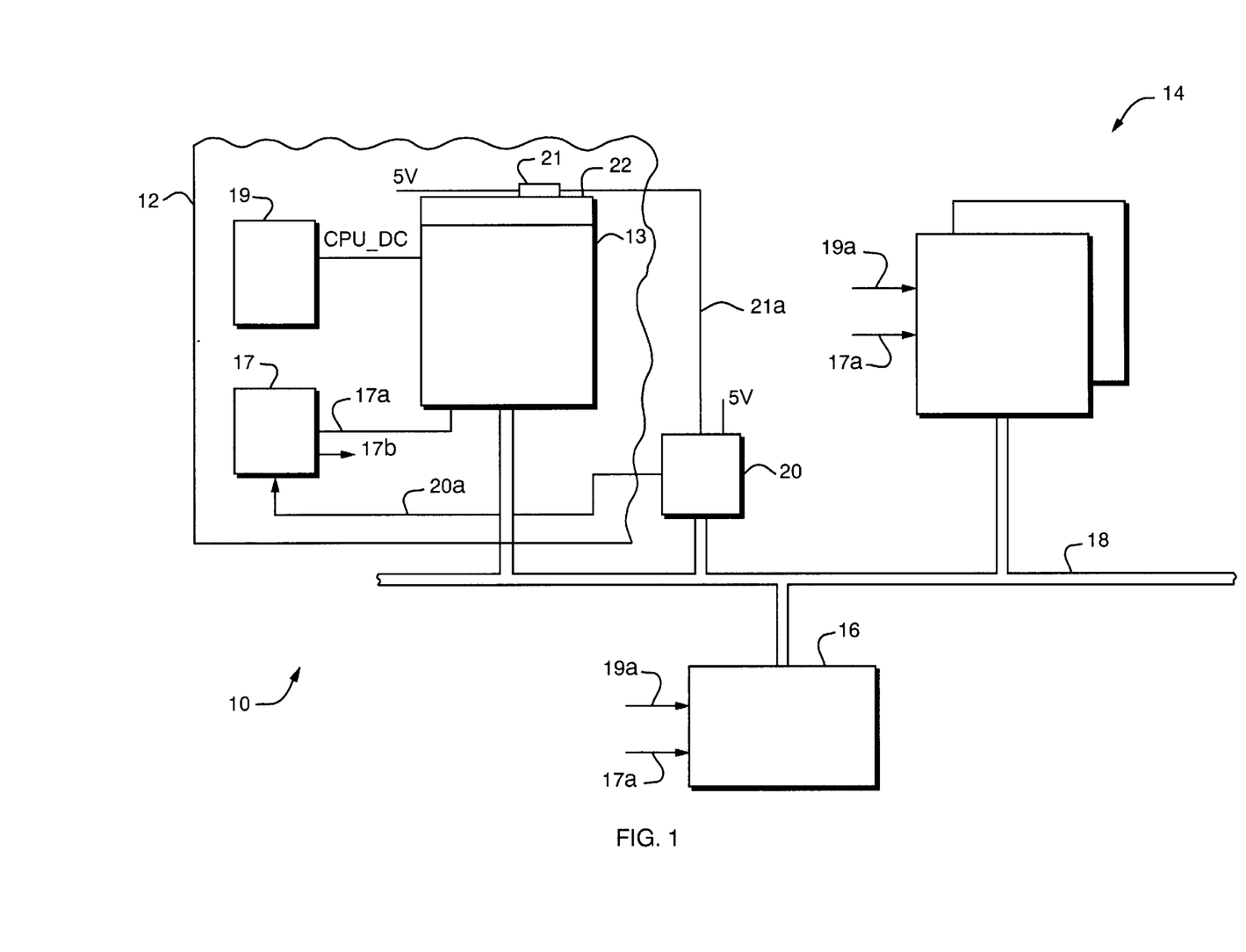
FIG. 1 is a block diagram of a computer system including a clock control circuit and power control circuit.

Referring now to FIG. 1, a computer system 10 is shown to include a processor module 12 which is coupled to a main memory bank 14 and an I/O adaptor or interface 16 via a computer system bus 18 as shown. The processor module 12 includes inter alia a CPU 13 which is here a ALPHA AXP microprocessor from Digital Equipment Corporation, Maynard, Mass. The ALPHA AXP microprocessor is here a reduced instruction set (RISC) type microprocessor although other microprocessors may alternatively be used. The computer module 12 further includes a clock control circuit 17 and a power control circuit 19 as will be further described in conjunction with FIGS. 2 and 3 below.

Suffice it here to say, however, that the clock control circuit 17 distributes a plurality of clock signals via bus 17*b* as needed to each of the modules in the computer system 10 in accordance with the designed for characteristics of the computer, whereas a variable speed clock signal as will be described is provided from the clock control module 17 to the processor 13 via line 17*b*. In some applications it might be desirable to distribute a variable speed clock to additional modules in the system.

The power control circuit 19 is resident on the processor board and delivers supply voltages of here 2.9 volts, 3.3 volts and 5.0 volts to the microprocessor on the module 12.

Here, there are additional power control circuits (not shown) to provide power to other modules in the computer system 10 as needed. In some implementations, it may be desirable to provide switched power to additional modules in the system.

The microprocessor 13 is shown to further include a heatsink 22 which is disposed over the actual microprocessor chip used to implement the microprocessor as diagrammatically depicted in FIG. 1. The heatsink has embedded in or attached thereto a temperature sensing integrated circuit 21 here an LM35 from National Semiconductor or alternatively a thermistor. Temperature sensor 21 is fed a voltage signal here illustratively 3.3 volts from the power sequence circuit 19 and provides an output signal to a microcontroller 20 via line 21*a*. The magnitude of the voltage signal provided from the temperature sensor circuit varies in accordance with its temperature.

Microcontroller 20 is coupled to the system bus and is used to read the voltage from the thermistor 21 disposed on heatsink 22 and to convert the value of voltage to a temperature using known techniques. Thus also included within the microcontroller 20 is an analog to digital converter which converts the analog representation of the voltage provided from thermistor 21 to a digital value which can be looked up in a table of values or calculated to determine a temperature as would be well-known to a person of skill in the art.

The microcontroller 20, in addition, implements a heat-management algorithm which will be discussed further in conjunction with FIGS. 4 through 7. The implementation of the heat-management algorithm provides values of the maximum clock frequency for the microprocessor in accordance with the operating conditions which the microprocessor is being exposed to. In addition, the microcontroller also provides signals to vary the supply voltage provided to the microprocessor to enable the microprocessor to operate at a reduced voltage under certain circumstances as will be described below.

Figure 2:
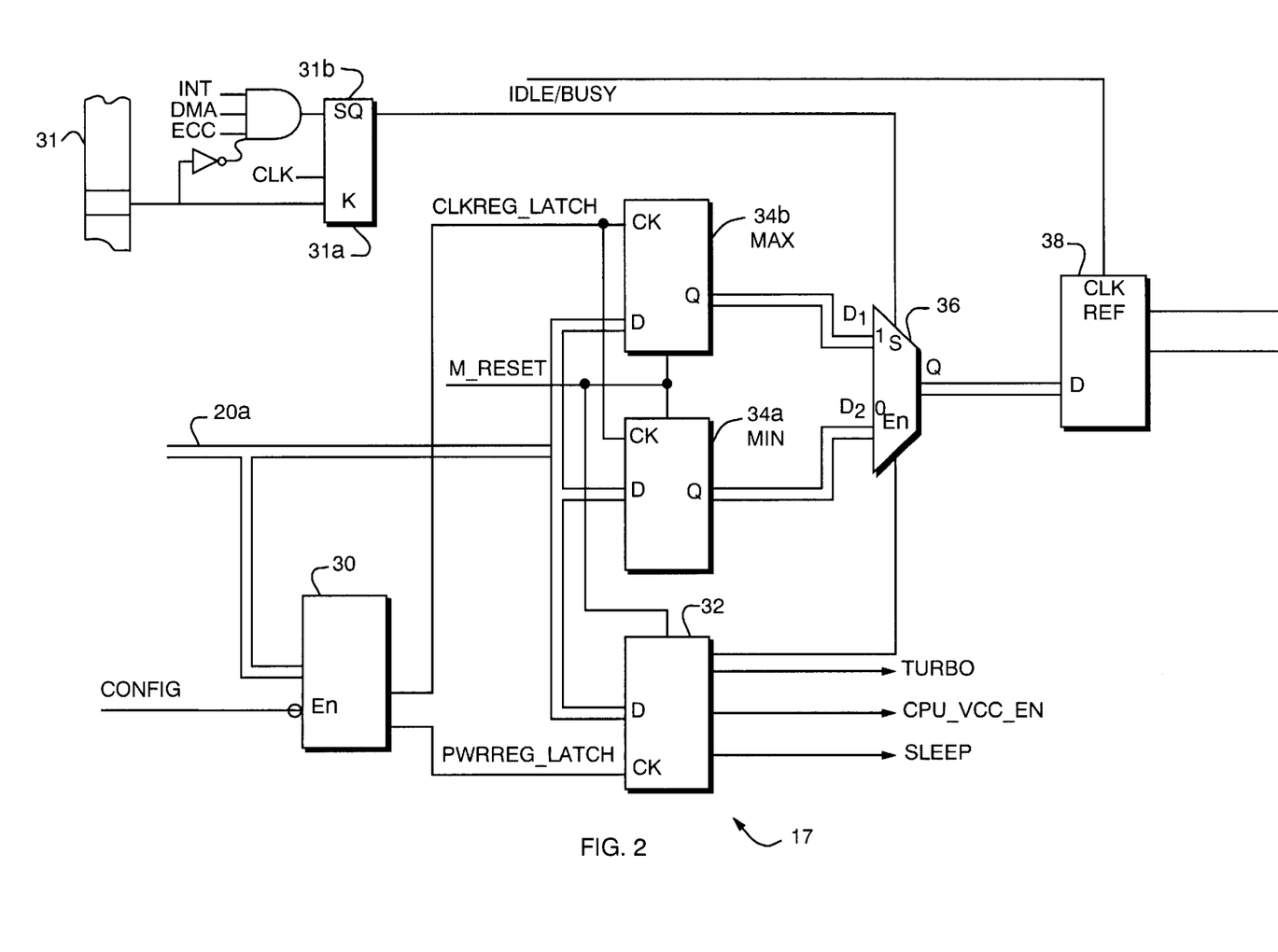
FIG. 2 is a schematic diagram of the clock control circuit used the computer system of FIG. 1.

Referring now to FIG. 2, clock control circuit 17 is shown to include a decoder 30 which here is fed selected bits from bus 20*a* from the microcontroller 20 and is used to form signals CLKREG_LATCH and PWREG_LATCH which are respectively used to load a pair of clock registers 34*a* and 34*b* and a power circuit control register 32 respectively as shown. The clock control logic 17 is further shown to include a multiplexer 36 which is fed via the outputs of registers 34*a* and 34*b* and which provides its output to a programmable phase lock loop (PLL) circuit 38. The PLL circuit 38 here Part No. ICS1561A obtained from Integrated Circuit Systems, Inc. is fed at the input terminals thereof with data corresponding to the contents of one of the registers 34*a* and 34*b* selected in accordance with the signal, "IDLE/BUSY" fed to a select input to the multiplexer 36. The PLL circuit 38 provides at the output thereof a pair of differential clock signals CLK and CLK_N which have a frequency corresponding to the data fed to terminal D of the PLL 38. The bus 20*a* coupled to the system bus 18 through an interface (not shown) thus loads register 34*a* with a digital value which will provide at the output of the PLL 38 a clock signal having a minimum clock frequency which typically, in the case of the aforementioned (CMOS) dynamic type of logic would be the minimum clock frequency necessary to maintain refresh operation on the dynamic logic in the circuit whereas, the second register 34*b* would be fed with data corresponding to the maximum clock frequency which would be either the maximum clock frequency under which the central processing unit can operate or some other maximum clock frequency as determined by temperature and power consumption considerations as will be described below in conjunction with the heat management algorithms.

The logic state of signal "IDLE/BUSY" is set to the idle state by using the idle thread in the host operating system. The idle thread clears or sets a bit "IDLE/BUSY" in a register 31 which can be a control and status register located in the I/O adapter 16 (FIG. 1) or elsewhere. This bit is used to reset a state device 31a. Gate 31b is used to set the state device 31a and has various inputs including signals indicating DMA (direct memory access) operation, an interrupt, and an exception. Also a signal IDLE_N from an inverter is fed to gate 31b to block gate 31b when the IDLE bit is asserted.

Figure 3A:
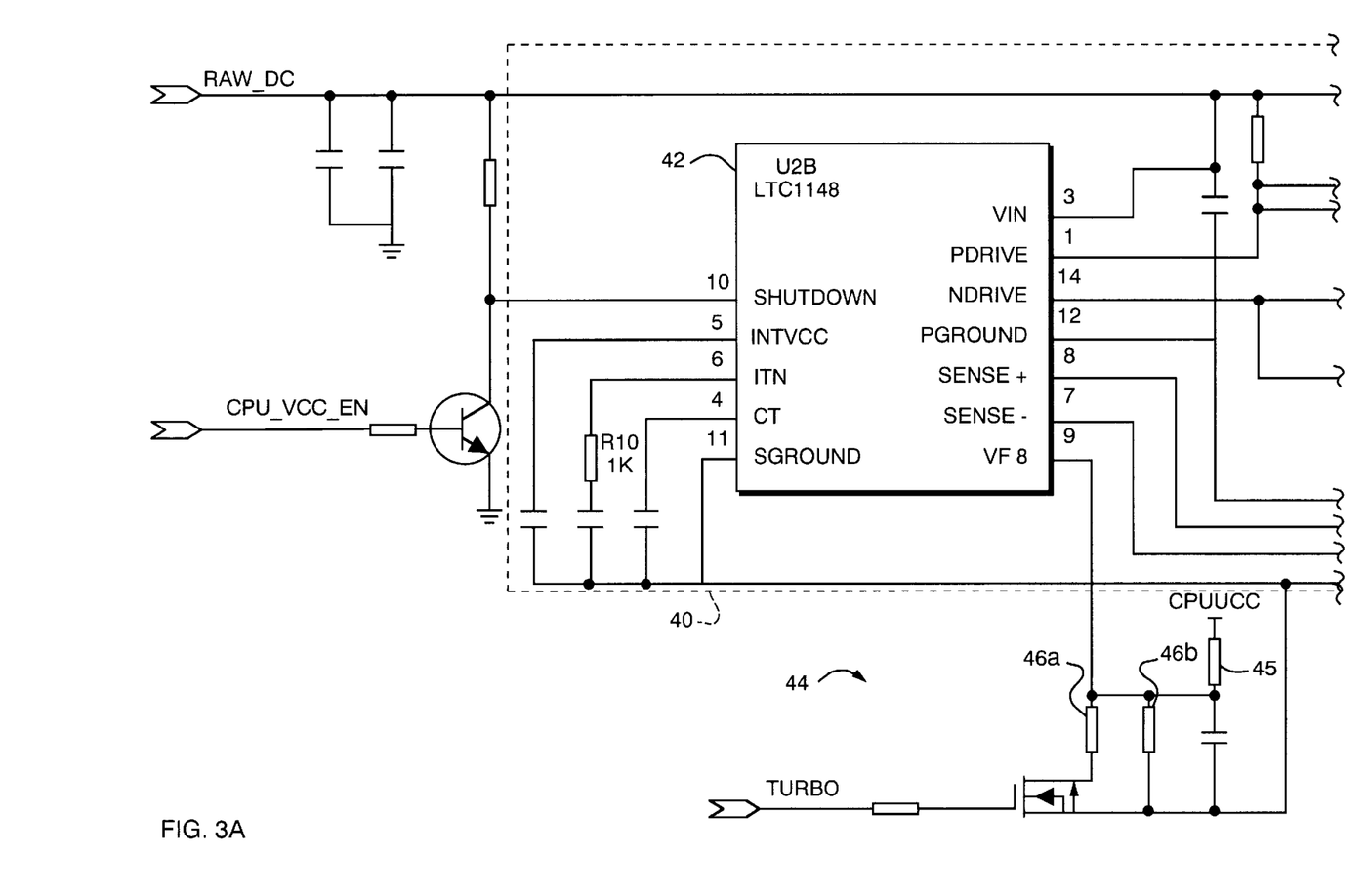
FIG. 3 is a schematic diagram of the power control circuit used in the computer system of FIG. 1.
Figure 3B:
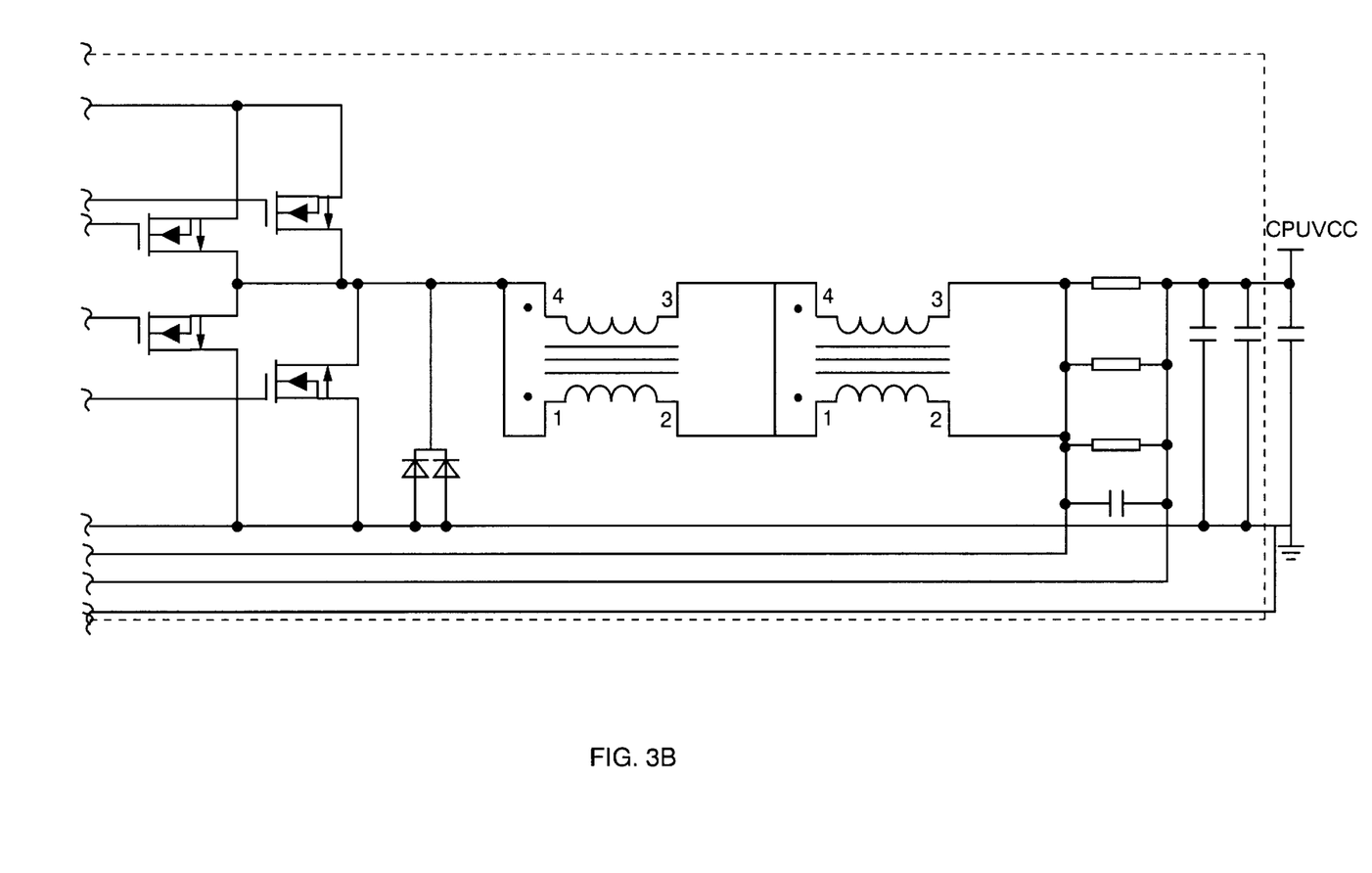
Figure 3C:
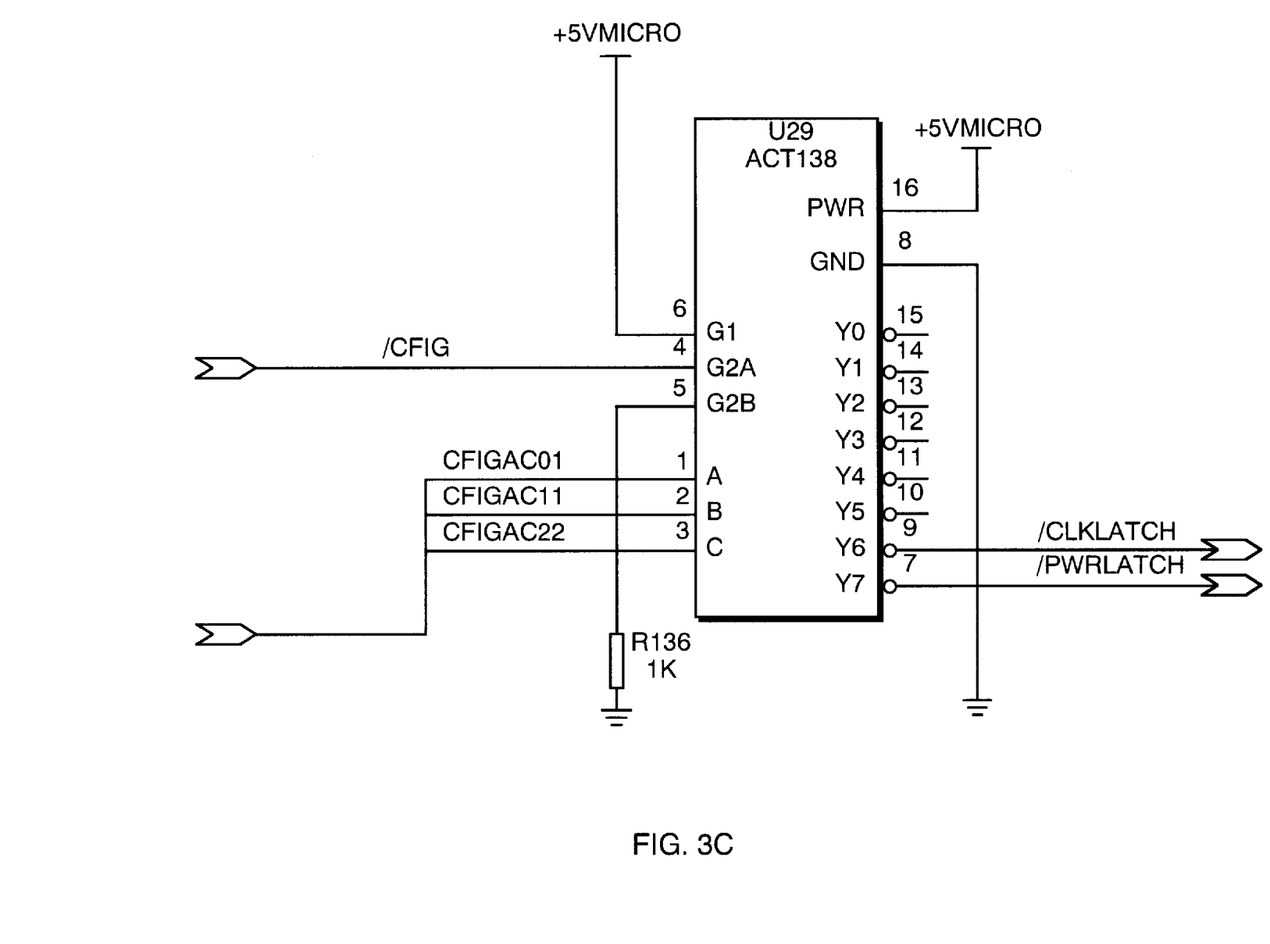

Referring now to FIG. 3, the power control circuitry 19 is shown to include a DC-to-DC converter generally denoted as 40 which includes a control input 42 which senses the output of the DC-to-DC converter and attempts to maintain that output within a predetermined value set by the input voltage at terminal VFB. Terminal VFB (feedback voltage terminal) is coupled to a switched resistive voltage divider network 44. The network 44 includes a fixed resistance value 45 and pair of resistors 46a, 46b disposed in parallel, with resistors 46a, 46b being coupled in series with resistor 45.

Resistor 46a has coupled in series therewith a transistor 48 which is controlled via signal TURBO. When TURBO is asserted, and thus transistor 48 is on, resistor 46a is electrically in parallel with resistor 46b and thus the effective resistance of the resistors is the parallel combination of the resistors 46a, 46b. Thus, the voltage divider ratio is the effective resistance of the parallel combination of resistors 46a and 46b divided by the sum of the effective resistance of resistors 46a and 46b and resistor 45. When TURBO is not asserted, the transistor is in an "off state" and the resistor 46a is not electrically in parallel with resistor 46b, and thus the effective voltage across resistor 46b is the ratio of resistor 46b to the sum of resistors 45 and 46b. With TURBO asserted therefore the effective voltage is higher since the effective value of resistor 46b is reduced by the parallel combination of resistor 46a and resistor 46b. Therefore, the ratio provided by the voltage divider 44 is adjustable in accordance with the state of signal TURBO. Thus, the voltage fed to terminal VFB and hence the value of the output voltage at the output of the DC-DC converter is determined in accordance with the logic state of signal "TURBO".

TURBO is asserted when the processor is operating at the maximum clock frequency for the processor and maximum supply voltage. The signal is de-asserted when it is desired to lower the magnitude of supply voltage provided to the CPU and lower the clock frequency. When the frequency of the clock signal is below the maximum operating value, it is also permissible to operate the central processor at a reduced supply voltage and still provide valid performance. For the processor mentioned above, the maximum frequency of operation is 166 MHz with a supply voltage of 3.3 volts whereas at frequencies of 140 MHz or less the processor can be operated at 2.9 volts.

Figure 4:
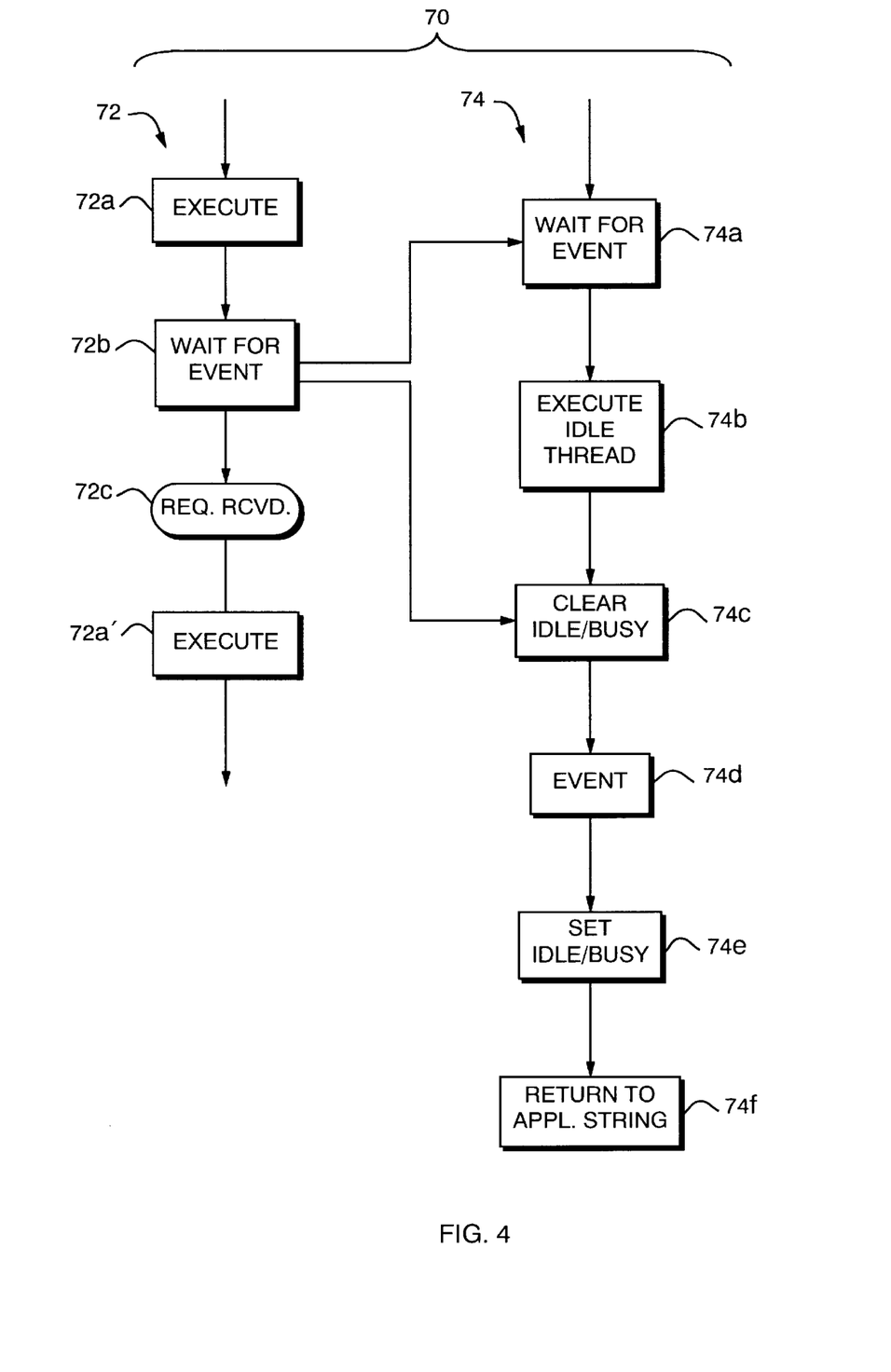
FIG. 4 is a flow chart showing the steps executed by an application program and operating system running on the computer system of FIG. 1.

Referring now to FIG. 4, one technique for determining when the microprocessor is in an idle state is shown. The microprocessor under control of an application program, as shown in flow diagram 72, executes an instruction or action at step 72a, and at step 72b, requests the operating system to wait for a specified event. Such an event could be illustratively a key being depressed on a keyboard, a disk access to be completed or some other event. At step 74a, the operating system shown by thread 74 waits for the event to occur and at step 74b executes an idle thread which is a software module within the operating system which places the operating system in an idle mode until the event being waited for is completed. During the execution of the idle thread, however, here the operating system "WINDOWS NT" from Microsoft Corp. is modified to clear the "IDLE/BUSY" bit in a control and status register located in the I/O adaptor 16 of the computer system shown in FIG. 1.

Clearing the IDLE/BUSY bit in the control and status register initiates a process to change the processor frequency between the minimum and the maximum frequencies in accordance with microprocessor usage. The period of time over which the idle thread will clear the idle bit to the control and status register can be a fixed time or the operating system can be configured such that the period of time is adjustable by a user.

Once the event being waited for occurs, the hardware at step 72e will set the IDLE/BUSY state device 31a to the busy state. This action can occur either by an interrupt, DNA exception, or other type of action, as noted above. The operating system is also interrupted which gets the operating system out of the idle thread. After servicing the interrupt, control is returned back to the executing program which requested the action, as shown in string 72. Thus, the requested event will be received as step 72c and executed at step 72a. The thread will be continued for subsequent actions by the application program 72.

A heat-management algorithm, as will be now described, is also implemented in the microcontroller in order to periodically calculate in accordance with operating conditions a new or updated maximum frequency either higher than, lower than or the same as, a current maximum frequency of operation of the processor 13.

Figure 5A:
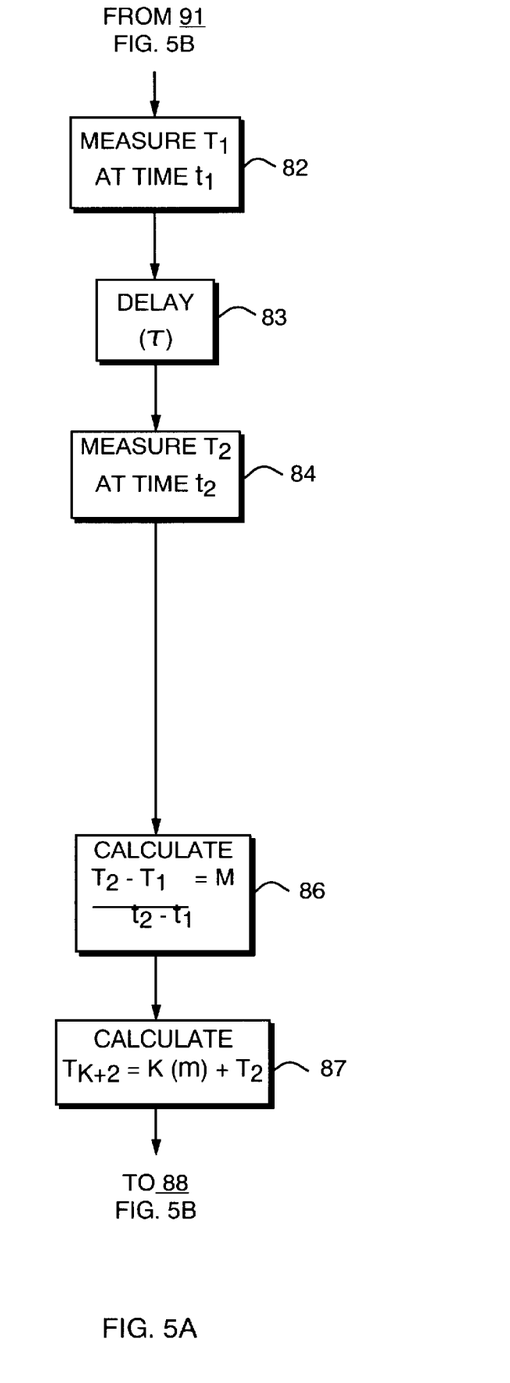
FIGS. 5A and 5B are flow charts which show the steps implemented in a heat management technique used in the computer of FIG. 1
Figure 5B:
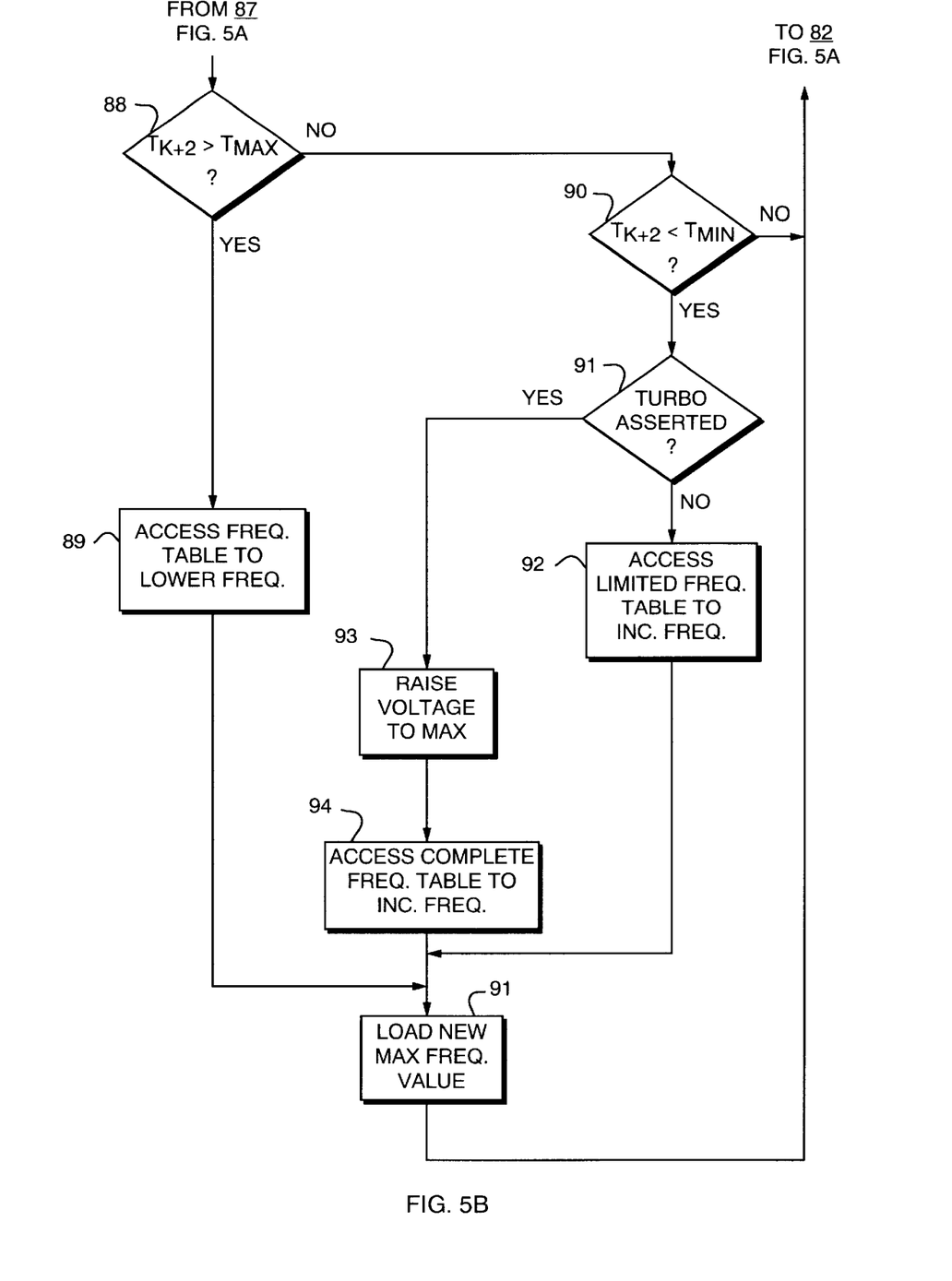

Referring now to FIGS. 5A and 5B, a preferred algorithm for implementing the heat management for the computer system shown in FIG. 1 is shown. The algorithm shown in FIG. 5A is implemented in the microcontroller 20 although other approaches could alternatively be used. The algorithm 80 depicted in FIGS. 5A and 5B is used to calculate a temperature upon which to make decisions whether or not operating parameters of the microprocessor 12 should be changed. In a preferred approach a predicted rather than a current temperature is calculated and is used to determine whether to make changes in operating parameters of the microprocessor 12. That is, a predicted temperature is calculated for one or more measurement intervals beyond the current measurement interval to determine actions to be taken with respect to the frequency of operation of the microprocessor and the supply voltage provided to the microprocessor. This approach minimizes oscillatory affects which can occur by using current temperature readings of a microprocessor as will be described later although the latter approach of using current temperature readings would be an alternative approach to implement a heat management system.

As shown in step 82 in FIG. 5A, a measurement is made of the temperature of the temperature sensor 21 (FIG. 1) at a time $t_1$ to provide a temperature $T_1$. After a predetermined delay $\tau$ (step 83), i.e. a measurement interval of here ten seconds, a second measurement of the temperature $T_2$ of circuit 21 is provided at time $t_2$. Although ten seconds is here a preferred delay period any delay period can be used. The slope (m) or the change in temperature per unit time is calculated at step 86. At step 87 a predicted temperature $T_{k+2}$ is extrapolated for a K number of time intervals. The value of K can vary between zero and any number with a preferred range of values for K being one to three. The value of K corresponds to the number of time intervals beyond the present interval it is desired to extrapolate to a predicted temperature.

The product of K and the slope m when added to the current temperature $T_2$ provides the predicted temperature $T_{K+2}$ which is an expected temperature at a subsequent time interval $t_{2-K}$. Thus, if the value of K is one, the predicted temperature $T_{K+2}$ is the temperature expected in a one subsequent measurement interval. If the value of K is zero then the predicted temperature $T_p$ is simply the current temperature $T_2$.

As shown in FIG. 5B, the predicted temperature, $T_{K+2}$ then compared to the maximum temperature $T_{MAX}$ for the microprocessor at step 88. If the maximum temperature is exceeded, then at step 89, the microcontroller 20 accesses a frequency table (not shown) to provide data corresponding to the next lowest frequency in the table for lowering the frequency of operation of the microprocessor 12 to the new frequency in accordance with the IDLE/BUSY signal explained above. The digital code representing the lower frequency value is loaded as the new maximum frequency value at step 95 into the register 34b (FIG. 2). Control is then returned to the beginning of the thread shown in FIG. 5A.

On the other hand, if the maximum temperature is not exceeded at step 88, then the microcontroller at step 90 tests whether the predicted temperature is below the minimum temperature $T_{MIN}$. If it is not below the minimum temperature, then control is again returned to step A. If it is below the minimum temperature, the microcontroller 20 determines whether TURBO has been asserted. If TURBO has not been asserted, then at step 92, the microcontroller again accesses the frequency table to provide a higher frequency to be loaded as a new maximum frequency value at step 95. However, since TURBO was determined to be "not asserted" at step 91, the frequency table which the microcontroller 20 accesses is limited to only those frequencies which can operate with the reduced supply voltage. If TURBO was asserted at step 91, however, then at step 93, the microcontroller accesses the complete frequency table to provide a higher frequency to load as a new "max" frequency value in step 95 and the control is then returned to the beginning of the thread.

Figure 6:
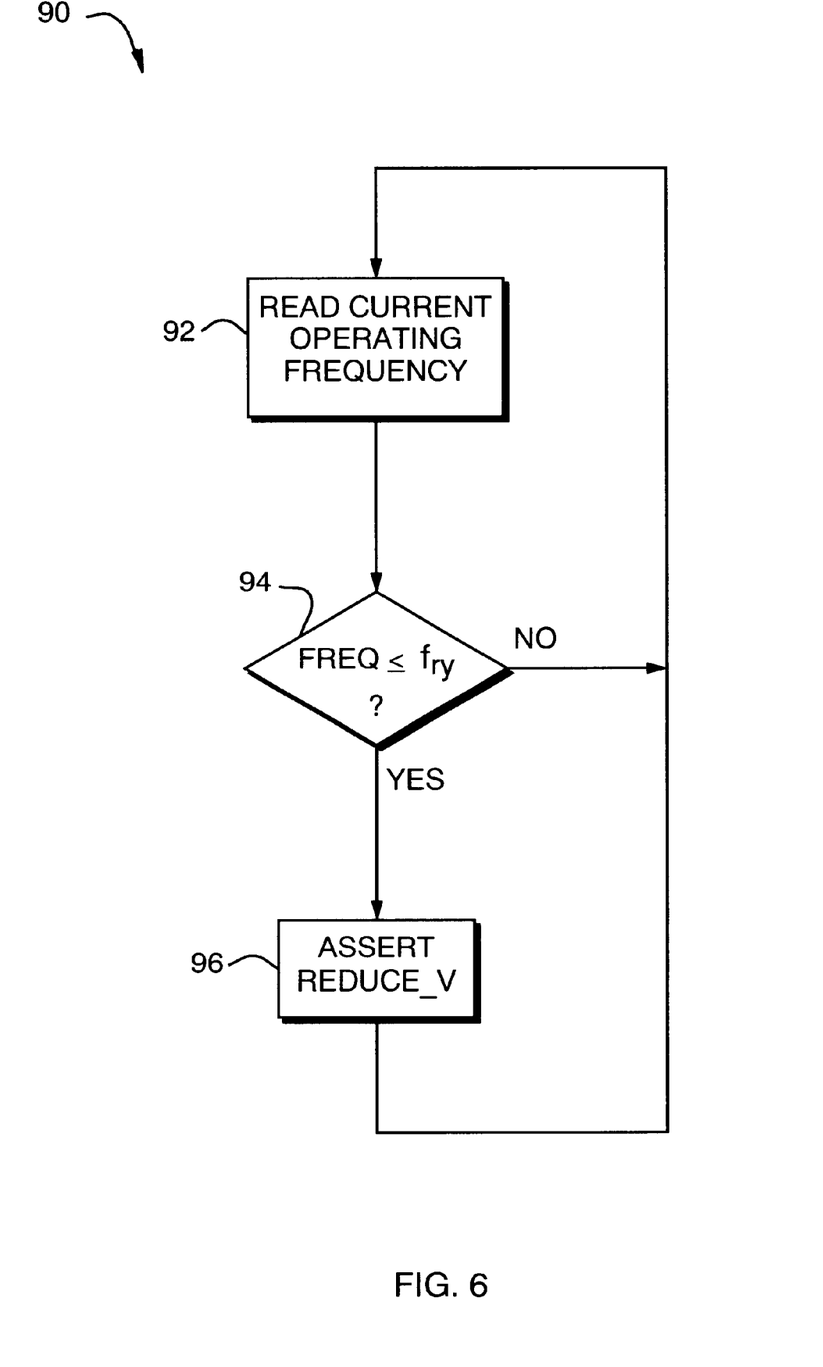
FIG. 6 is a flow chart showing the steps used to determine whether the computer system of FIG. 1 can operate at reduced supply voltage.

Referring now to FIG. 6, a separate thread executed by the microcontroller is shown. This thread reads the current operating frequency of the microprocessor, at step 92, and at step 94, determines whether the current operating frequency is less than or equal to the operating frequency at which the microprocessor can operate at a reduced supply voltage. If the current frequency is a frequency in which the microprocessor can be operated at a reduced supply voltage, the microcontroller asserts signal REDUCE_V to reduce the supply voltage to the microprocessor and returns control back to the main thread being executed in the microcontroller 20.

Figure 7:
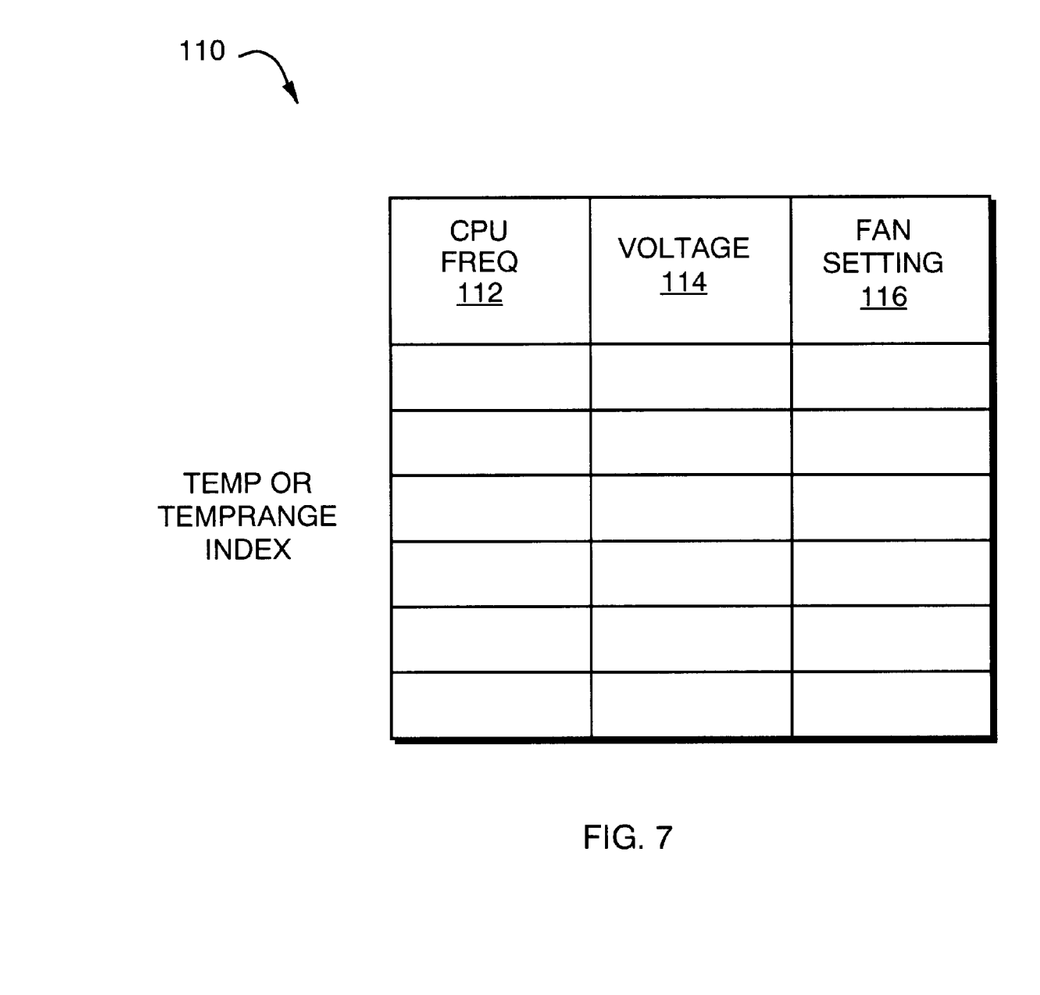
FIG. 7. is a table used in an alternate technique for heat management.

Referring now to FIG. 7, an alternative algorithm which can be implemented for heat management is shown to include a table 110 which has a first field 112 listing available, allowable CPU operating frequencies, a second field 114 which has listed acceptable supply voltages corresponding to the operating frequencies in field 112 and a third field which has a fan setting 116 for those systems which incorporate a fan in the computer. The current temperature read from the thermistor is used as an index into the table 110 to provide as outputs thereof the next operating frequency of the CPU, supply voltage of the CPU, and a fan setting of the computer.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A computer system comprising:

microprocessor;

means for generating a clock signal, said means including means responsive to a control signal for selecting a minimum clock signal frequency value and a maximum clock signal frequency value;

a microcontroller coupled to a system bus interconnecting said microprocessor to the computer system, wherein said microcontroller comprises:

means responsive to a signal indicating a temperature of operation of the microprocessor for adjusting the frequency of operation of the microprocessor in accordance with a present temperature of the microprocessor.

2. The apparatus as recited in claim 1 wherein further comprising:

means for sensing the temperature of operation of the microprosessor at a plurality of times; and means for calculating an expected temperature based on temperatures sensed at said plurality of times.

3. The apparatus as recited in claim 2 wherein said means for sensing the temperature of the microprocessor comprises a thermistor.

4. The apparatus as recited in claim 2 wherein said means for generating a clock signal further comprises means for selecting the minimum value of clock frequency and said means for selecting a minimum and a maximum value of clock frequency comprises:

a storage register for storing a minimum value and maximum value of a clock signal; and means responsive to a control signal provided from said means for adjusting including means for selecting the minimum value of the clock signal when the microprocessor is determined to be in an idle state and for selecting a maximum value of the clock signal when the microprocesser is determined to be in an active state, wherein said means responsive to a control signal further adjusts the frequency in accordance with a predicted temperature of said microprocessor, with said predicted temperature being determined in accordance with the present temperature and a change in the present temperature over at least one measurement time interval.

5. The apparatus as recited in claim 1 wherein said means for adjusting the frequency adjusts the frequency in accordance with a predicted temperature of the microprocessor, with said predicted temperature being determined in accordance with the present temperature and change in the present temperature over at least one measurement time interval.

6. The apparatus is recited in claim 1 wherein said means for generating a clock signal comprises:

a programmable phased lock loop which is fed digital data corresponding to either the minimum or maximum clock frequency.

7. The apparatus as recited in claim 5 wherein said apparatus further comprises:

means for varying a magnitude of a supply voltage fed to the microprocessor in accordance with the temperature of the microprocessor and the operating frequency of the microprocessor.

8. The apparatus as recited in claim 7 wherein said means for varying a magnitude of a supply voltage comprises:

a DC to DC converter to provide a supply voltage to the microprocessor; and a switchable voltage divider, responsive to a control signal for varying a voltage across the voltage divider in accordance with the state of the control signal, with said voltage across the voltage divider being fed back to the DC to DC converter to change the magnitude of the supply voltage from the DC to DC converter.

9. A computer system comprising:

a microprocessor;

means for varying a magnitude of a supply voltage fed to the microprocessor in accordance with the temperature of the microprocessor and the operating frequency of the microprocessor including:

a DC-to-DC converter to provide a supply voltage to the microprocessor; and a switchable voltage divider, responsive to a control signal for varying a voltage across the voltage divider in accordance with the state of the control signal, with said voltage across the voltage divider being fed back to the DC-to-DC converter to change the magnitude of the supply voltage from the DC-to-DC converter.

10. The computer system of claim 9 further comprising:

means for generating a clock signal, said means including means responsive to a control signal for selecting the minimum clock frequency value when the microprosessor is in an idle state;

means for selecting the maximum clock frequency value when the microprocessor is in an operating state; and means for adjusting the maximum clock frequency value in accordance with operating conditions of the central processor.

* * * * *